US008820727B2

(12) United States Patent
Dale

(10) Patent No.: US 8,820,727 B2

(45) Date of Patent: Sep. 2, 2014

(54) RAPID DOGGING AND ROLLING SYSTEM

(71) Applicant: Norwood Industries Inc., Kilworthy (CA)

(72) Inventor: Peter Dale, Kilworthy (CA)

(73) Assignee: Norwood Industries Inc., Kilworthy, Ontario (CA)

(*) Notice: Subject to any disclaimer, the term of this patent is extended or adjusted under 35 U.S.C. 154(b) by 0 days.

(21) Appl. No.: 13/936,487

(22) Filed: Jul. 8, 2013

(65) Prior Publication Data

US 2014/0015184 A1 Jan. 16, 2014

(30) Foreign Application Priority Data

Jul. 11, 2012 (CA) ...................................... 2782909

(51) Int. Cl.

| | |
|---|---|
| ***B23Q 1/64*** | (2006.01) |
| ***B23Q 1/25*** | (2006.01) |
| ***B25B 1/22*** | (2006.01) |
| ***B23Q 3/00*** | (2006.01) |
| ***B27B 31/00*** | (2006.01) |
| ***B27B 29/08*** | (2006.01) |
| ***B27B 29/02*** | (2006.01) |
| *B27B 17/00* | (2006.01) |

(52) U.S. Cl.

CPC ............... *B27B 29/08* (2013.01); *B27B 31/003* (2013.01); *B27B 17/005* (2013.01); *B27B 29/02* (2013.01)

USPC .......... 269/56; 269/289 MR; 269/55; 269/71; 269/75

(58) Field of Classification Search

CPC ................................ B27B 29/00; B23D 55/00

USPC ................ 269/289 MR, 291, 131, 55, 71, 75; 29/281.1

See application file for complete search history.

(56) References Cited

U.S. PATENT DOCUMENTS

| | | | |
|---|---|---|---|
| 3,695,316 | A | 10/1972 | Pluckhahn |
| 3,926,086 | A | 12/1975 | Crane |
| 3,965,788 | A | 6/1976 | Granberg |
| 4,210,049 | A | 7/1980 | Gauthier |
| 4,235,140 | A | 11/1980 | Reece |
| 4,245,535 | A | 1/1981 | Lockwood et al. |

(Continued)

FOREIGN PATENT DOCUMENTS

| | | |
|---|---|---|
| CA | 1200180 | 2/1986 |
| CA | 2541734 | 10/2007 |

OTHER PUBLICATIONS

Office Action dated Mar. 25, 2013, for corresponding Canadian Patent Application No. 2,782,909.

*Primary Examiner* — Lee D Wilson

*Assistant Examiner* — Seahee Yoon

(74) *Attorney, Agent, or Firm* — Calfee, Halter & Griswold LLP

(57) ABSTRACT

A log rolling, support and clamp assembly includes a longitudinal frame having a plurality of rollers coupled to and positioned along the length of the frame from a first end to a second end and permitting rolling of a log on the assembly. A log rest and an opposing log dog are coupled to the frame, the log dog being slideably moveable towards the log rest. The assembly is attachable to a portable sawmill and assists in handling the logs after being loaded on the bed of the sawmill. Also disclosed is a sawmill and a kit having such an assembly.

18 Claims, 9 Drawing Sheets

(56) References Cited

U.S. PATENT DOCUMENTS

| | | | | |
|---|---|---|---|---|
| 4,275,632 | A | 6/1981 | Ross | |
| 4,300,428 | A | 11/1981 | Woodland | |
| 4,307,641 | A | 12/1981 | Shapleigh | |
| 4,640,170 | A | 2/1987 | Bakken | |
| 5,243,892 | A | 9/1993 | Jindra | |
| 5,784,941 | A | 7/1998 | Sanborn | |
| 6,267,544 | B1 * | 7/2001 | Neville | 414/23 |
| 2011/0132166 | A1 * | 6/2011 | Dale | 83/453 |

* cited by examiner

RAPID DOGGING AND ROLLING SYSTEM

CROSS-REFERENCE TO RELATED APPLICATION

This application claims priority to, and all benefit of, Canadian Patent Application No. 2,782,909, filed on Jul. 11, 2012, the entire disclosure of which is incorporated herein by reference.

FIELD

The specification relates to a log roller, support and clamp assembly.

BACKGROUND

One of the challenging aspects in sawmilling is the actual handling of the logs; as the logs can be heavy and awkward. To overcome these impediments on portable sawmills (non-hydraulic or powered), operators use traditional tools such as cant-hooks to gain leverage. Similarly, when it comes to clamping a log, it can be a fairly challenging process as well. The operator has to push the log against the log rests, hold it there with one hand or leg, while positioning and clamping the opposing log "dog". Operation of the log rest and the log dog each requires two hands.

A number of portable sawmills have been described in the art.

U.S. Pat. No. 5,784,941 describes a portable sawmill in which the functions of adjusting a cut and making a cut are divided between two separate devices. The invention discloses a vertical chain saw, ideally operated in an upward direction. The patent also discloses a log restraint system comprising a setwork having a headstock and a lockable L-shaped log dog, joined by a clamp which is locked with a lever.

U.S. Pat, No. 5,243,892 discloses a portable sawmill with a frame base and an inverted U-shaped frame, supported by a carriage rolling along side tracks defined by the frame base. In use, the log is placed on the U-shaped frame and clamped with a tubular clamp held within a sleeve and locked in place using threaded blocks.

U.S. Pat. No. 4,640,170 discloses a portable saw mill with a frame that surrounds the log. The frame is dragged or slid along a frame supporting surface. The frame holds a chain saw at the two ends of its blade, in horizontal fashion, with chain saw support members. The invention uses sliding means for facilitating the movement of the frame over the log. The log is secured against rolling using a simple jig or similar means.

U.S. Pat. No. 4,275,632 describes a portable sawmill comprising a U-shaped support or carriage, holding a band saw. When in use, a log is placed between the two guide rails and is supported in place by appropriately distanced log supports.

U.S. Pat. No. 4,307,641 describes a portable sawmill comprising two skid rails, vertical support members, a pair of guide rails. The log is held in place by two externally threaded log screw pins with pointed ends.

U.S. Pat. No. 4,300,428 describes a portable sawmill having a frame, a guide member mounted above the frame, and a carriage. The chain saw is mounted above the log, and operates at about a 45 degree angle to the horizontal. The log is held in place with log dogs which are adapted for hooking the log and holding it in position.

U.S. Pat. No. 4,235,140 describes a saw mill. The logs are held in place with a standard log dog attached to the cross members on which the log is placed.

U.S. Pat. No. 3,965,788 describes a saw guide for use with a vertically operated portable chain saw. The saw guide apparatus is attached directly to the log.

U.S. Pat. No. 3,926,086 describes a portable saw mill that uses a complex pulley system to move the chain saw and supporting platform. When in use, a log is placed, and clamped, between the guide rails, using a set of circular discs eccentrically oriented on a rod.

U.S. Pat. No. 3,695,316 describes a portable timber milling jig that uses a carriage, holding a chain saw, axially surrounding a square guide rail. The chain saw is held at an approximately 45 degree angle and only uses one guide rail, and utilizes ball bearings on the carriage to move the carriage with respect to the guide rail. When in use, a log is placed under the guide rail, and fixed using clamping points driven into the center of the log, to which support clamps are fastened.

Canadian Patent No. 1,200,180 describes a portable saw mill comprising a frame with a guide rail and a carriage moveable along the guide rail. A band saw is supported by the carriage. The carriage is moveable along the guide rail along two sets of wheels, one engaged with the upper side of the guide rail and the other with the lower side. The log is held in place by its own weight, or by stops and a traditional locking dog.

U.S. Pat. No. 4,245,535 describes a portable sawmill with an elaborate hydraulic apparatus for cutting a log. The chain saw cuts in a vertical motion. The log is held in place using a log holding assembly having a toothed prod which grips the outer end of the log, and a cylinder which impales the inner end of the log with a ram, forcing the outer end against the prod.

U.S. Pat. No. 4,210,049 describes an "x" frame for holding a log, with a chain saw affixed to the frame in cantilever position for cutting logs crosswise. The log is held in the nook of the "x" frame.

Canadian patent application 2,541,734 to the present inventor describes a portable sawmill that is easily assembled and disassembled into portable components, and which can use generic components as its saw and/or guide rails. The log is held in place using traditional log dogs.

There is a need in the art for log support and clamp assembly that can assist with the handling, rolling and clamping of logs. In addition, there is a need in the art for a sawmill having such a log support, rolling and clamp assembly. Moreover, there is a need in the art for a kit for retrofitting a log support and clamp assembly to a portable sawmill that can help with log handling, rolling and clamping.

SUMMARY OF INVENTION

In one aspect, the specification relates to a log rolling, support and clamp assembly, containing:

- a longitudinal frame having a first end and a second end;
- a plurality of rollers positioned along the length of the frame from the first end to the second end and permitting rolling of a log on the assembly; and
- a log rest and an opposing log dog coupled to the frame, the log dog being slideably moveable towards the log rest.

In one embodiment in accordance with the specification, the log rest is coupled proximately to the first end of the frame, and the log dog is coupled proximately to the second end of the frame and slideably moveable from the second end towards the first end.

In another embodiment in accordance with the specification, the log rest contains a log rest first face and a log rest second face, the log rest being pivotably rotatable about an axis from a log rest first position to a log rest second position, wherein the log rest permitting contact of the log with the log rest first face in the log rest first position and the log rest second face in the log rest second position. In a further embodiment, in accordance with the specification, the log rest is a generally L-shaped member. In a still further embodiment in accordance with the specification, the log rolling, support and clamp assembly further contains a wheel at an end of the log rest.

In still another embodiment in accordance with the specification, the rollers contain a plurality of wheels positioned on a back face of the frame. In still another embodiment in accordance with the specification, the log rest and the log dog are positioned on a front face of the frame.

In another further embodiment in accordance with the specification, the log dog is fixably releasable for slidable movement of the log dog in a direction generally perpendicular to the longitudinal length of the frame. In a further embodiment in accordance with the specification, the log dog and clamp assembly are provided with a fastening means for affixing the log dog for preventing movement of the log dog in a direction generally perpendicular to the longitudinal length of the frame. In a still further embodiment in accordance with the specification, the fastening means is a bolt. In another still further embodiment in accordance with the specification, the log dog contains a post and a pick at an end of the post. In a still further another embodiment in accordance with the specification, the log dog further contains a handle.

In another aspect, the specification relates to a portable sawmill having one or more log rolling, support and clamp assembly as disclosed herein.

In another further aspect, the specification relates to a kit for retrofitting a log rolling, support and clamp assembly, as disclosed herein, to a portable sawmill.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
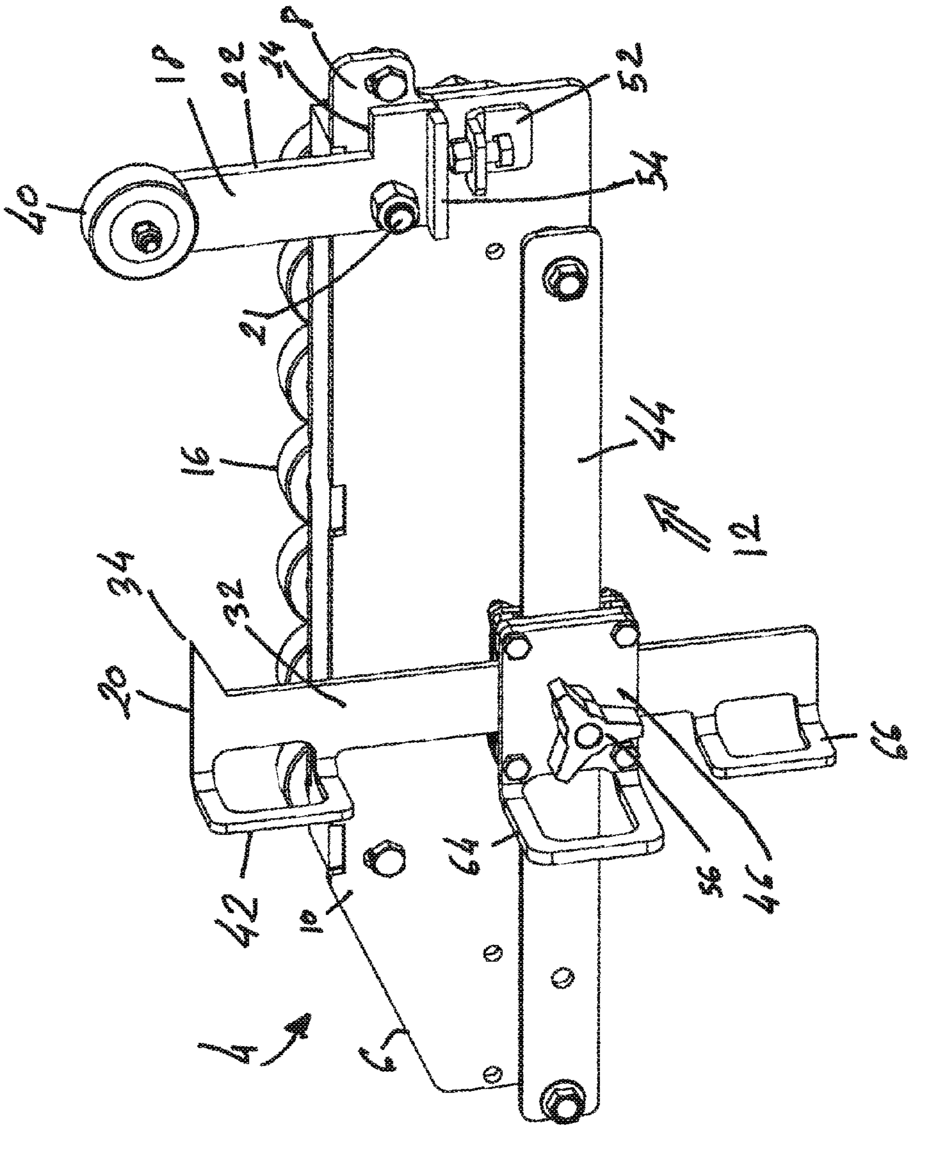
FIG. 1 is perspective view of the front face of the log rolling, support and clamp assembly in accordance with one embodiment of the specification.
Figure 2:
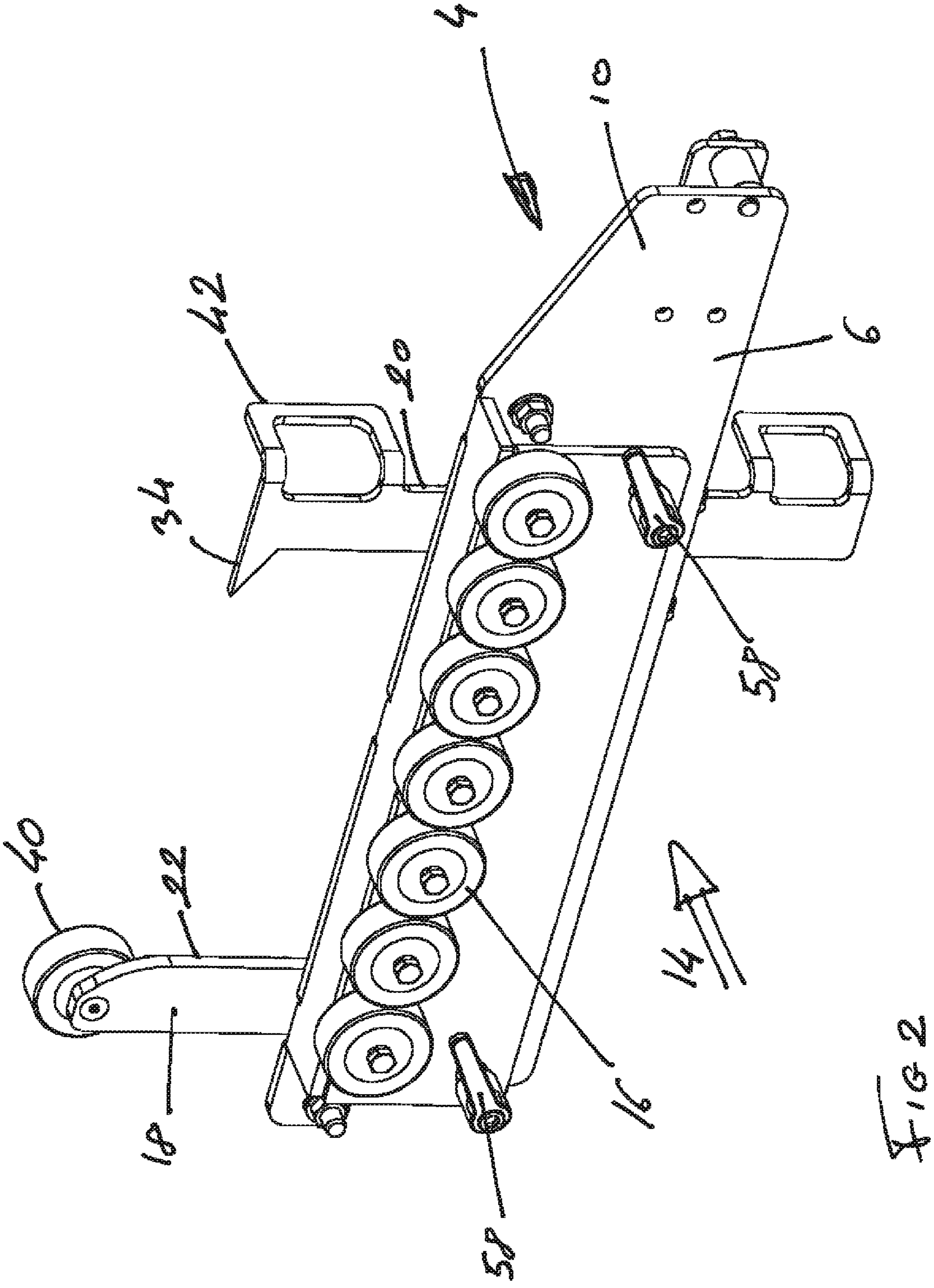
FIG. 2 is a perspective view of the back face of the log rolling, support and clamp assembly as shown in FIG. 1.
Figure 3:
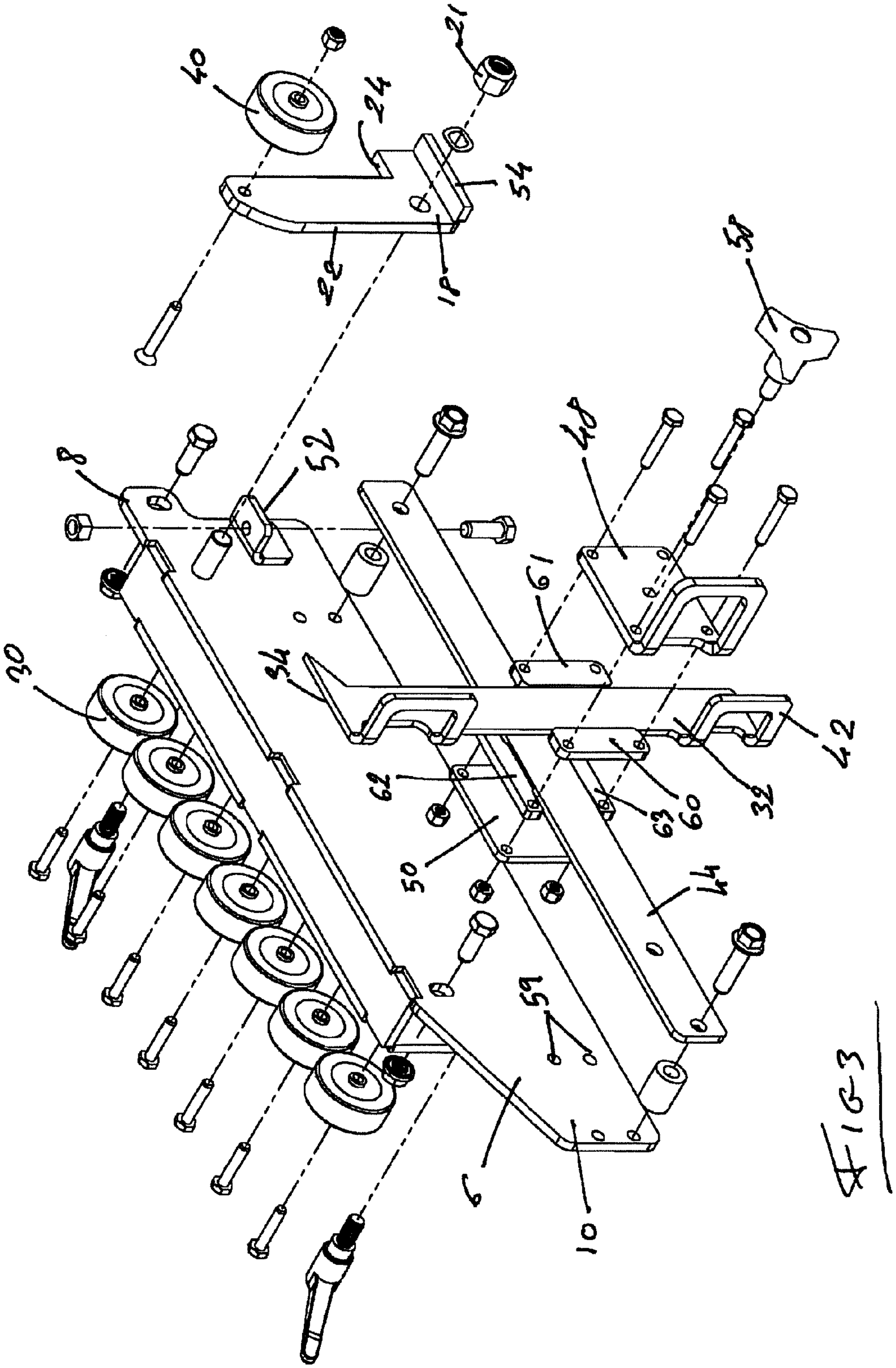
FIG. 3 is an exploded perspective view of the log rolling, support and clamp assembly shown in FIG. 1.

Referring to FIGS. 1-3, which discloses a log rolling, support and clamp assembly (4) in accordance with one aspect of the specification. The assembly (4) contains a longitudinal frame (6) that has a first end (8) and a second end (10). The type, structure and material of construction for the frame (6) is not particularly limited.

Figure 4:
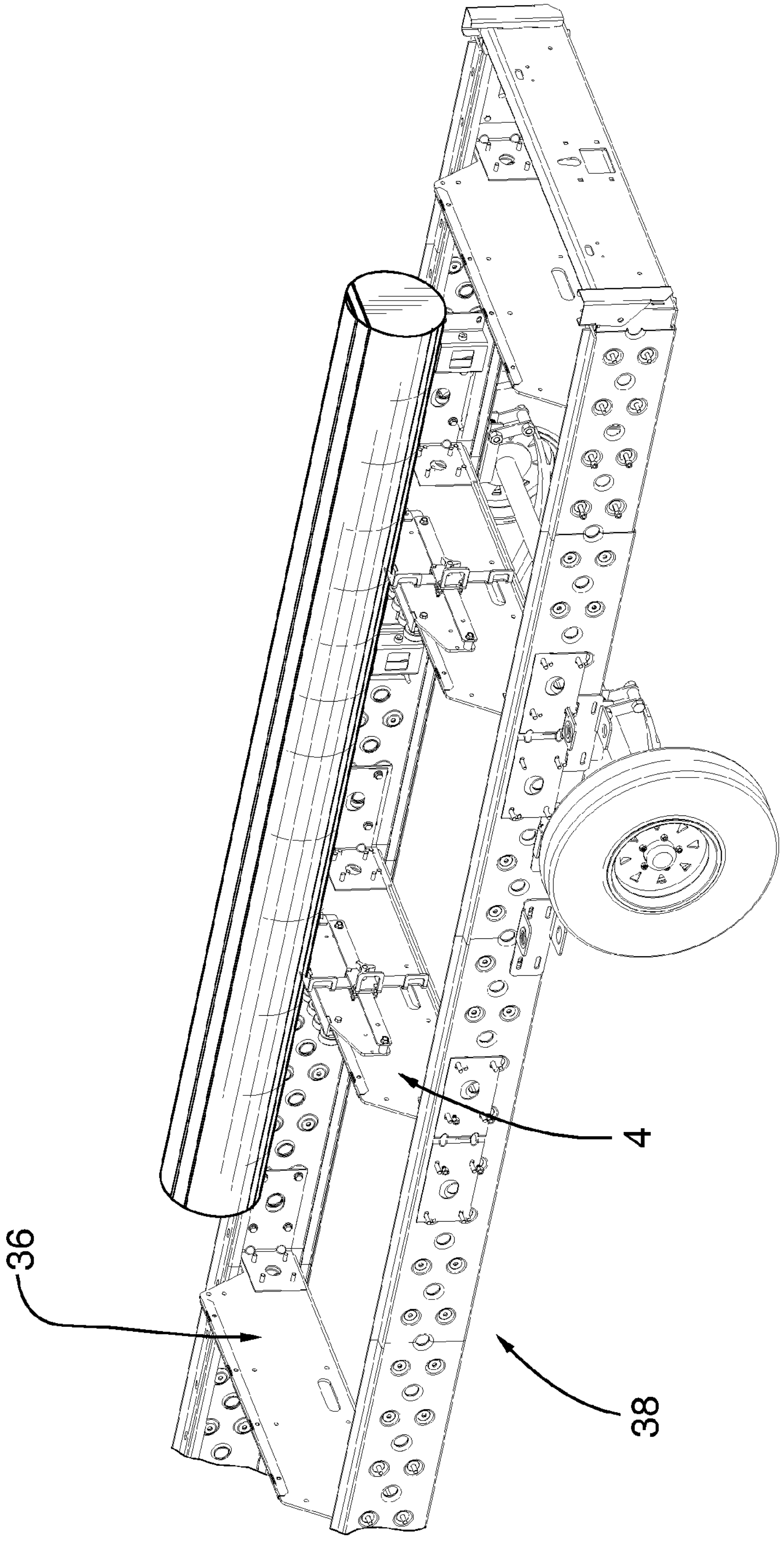
FIG. 4 is perspective view from the log dog side of a bed of a portable sawmill having the log rolling, support and clamp assembly.
Figure 5:
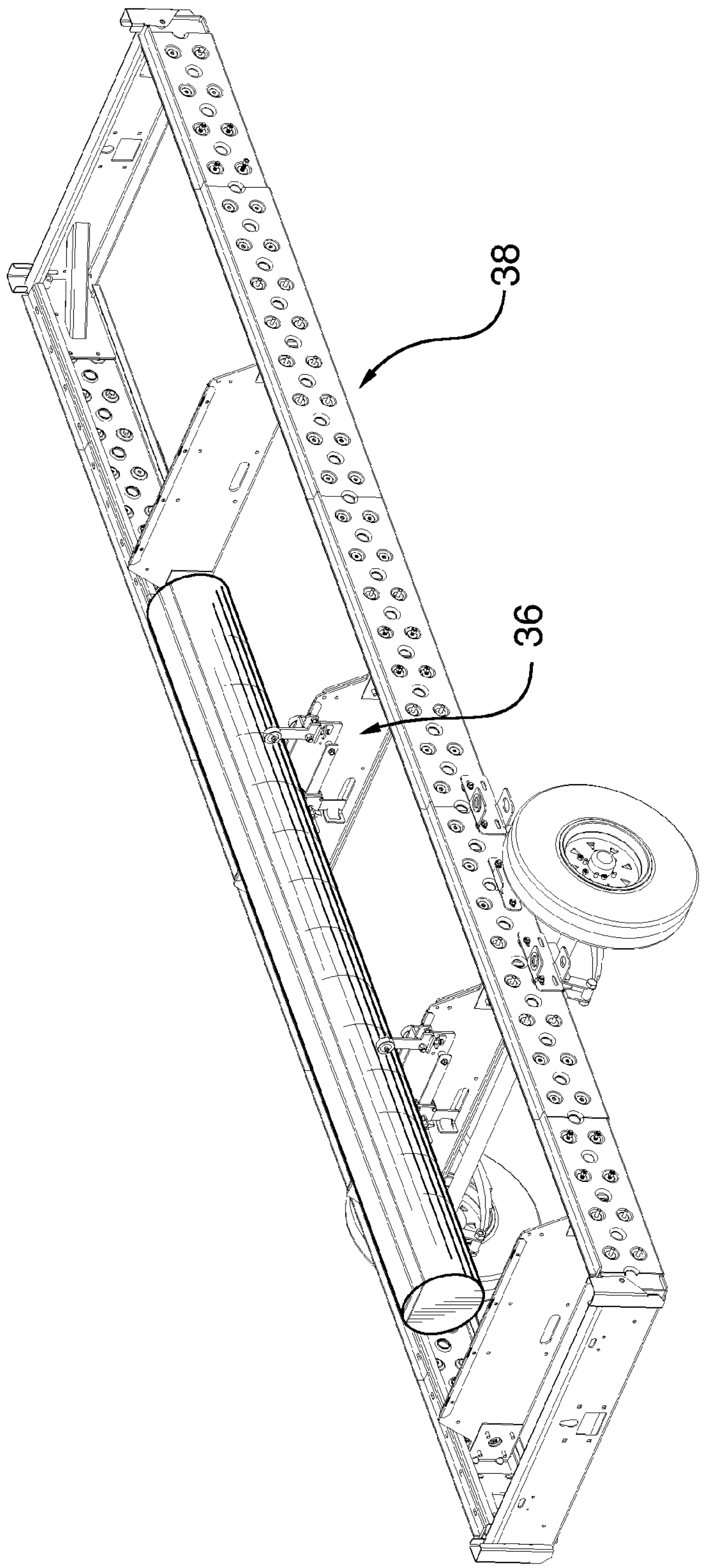
FIG. 5 is perspective view from the log rest side of a bed of a portable sawmill having the log rolling, support and clamp assembly.

In the embodiment disclosed in FIGS. 4 and 5, the frame (6) can be attached to a cross-bunk (36) of a log deck (or bed) (38) of a sawmill, such as a portable sawmill; and forms part of the assembly (4). Alternatively, one of the cross-bunks (36) of a log deck (38) of a portable sawmill can be used as the frame (6) or replaced with another appropriate frame (6) (not shown) to which the different components of the assembly (4) are attached. The bed (38) of the sawmill can contain one or more, for example and without limitation, two, three, four, five or six, assemblies (4) for maneuvering logs on the bed (38).

As seen best in FIGS. 2, 3 and 4, the assembly (4) is configured to fit, affix, and even hang on the crossbunks (36). Its position can then be secured to the crossbunk by a system such as bolts through bolt holes (59).

Returning to FIG. 1, each assembly (4) is provided with a plurality of rollers (16) positioned along the length of the frame (6) from the first end (8) to the second end (10), which permit rolling of the log on the assembly (4). The log rests directly on these rollers (16). The rollers (16), in turn, can substantially reduce friction such that the operator can, more easily, and often without any additional tools such as a cant hook, roll the log around and into cutting position by hand. The rollers (16) are not so high above the top of the bunks (36) or frame (6) that they interfere with the cutting or substantially affect capacity.

In the embodiment disclosed in FIGS. 1-3, the rollers (16) are formed by a series of wheels (30) that are coupled to the frame (6), for example, by use of bolts that permits rotation of the wheels (30). In an alternative embodiment (not shown), other rolling-element bearings, such as a ball-bearing (where a series of balls in a carriage replace the wheels) can be used to help with rolling the logs.

The second element of each assembly (4) is the log clamping functionality. Each assembly (4) includes a log rest (18) and an opposing log dog (20) coupled to the frame (6), with the log dog (20) being slideably moveable towards the log rest (18), for co-operatively clamping the log. In the embodiment disclosed in FIGS. 1-3, the log rest (18) is coupled proximately to the first end (8) of the frame (6). The log dog (20) is coupled proximately to the second end (10) of the frame (6), and is slideably moveable from the second end (10) towards the first end (8).

Figure 12:
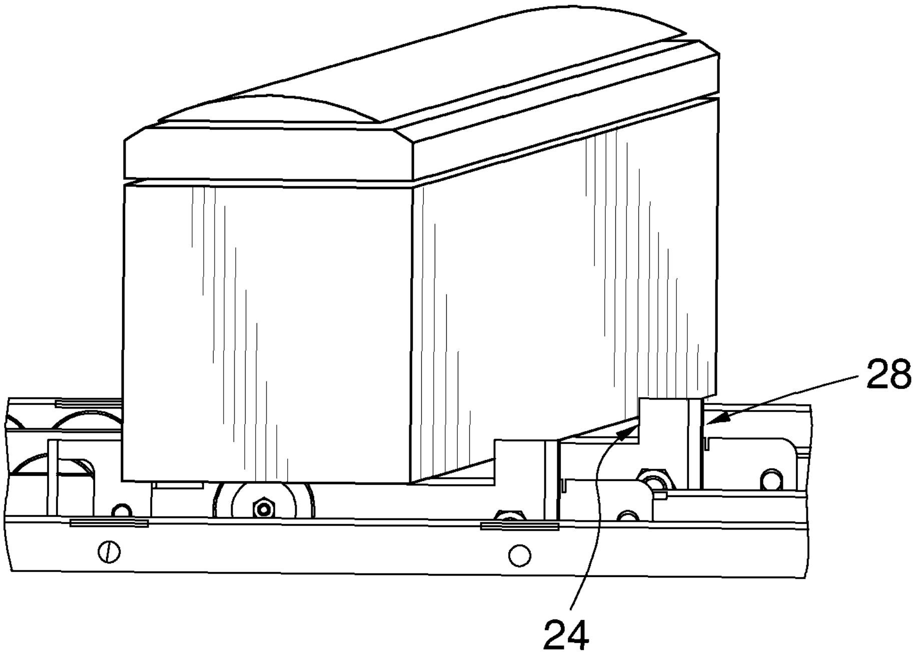
FIG. 12 is a front perspective view from the log rest side having the log rest in a second, lowered position.
Figure 13:
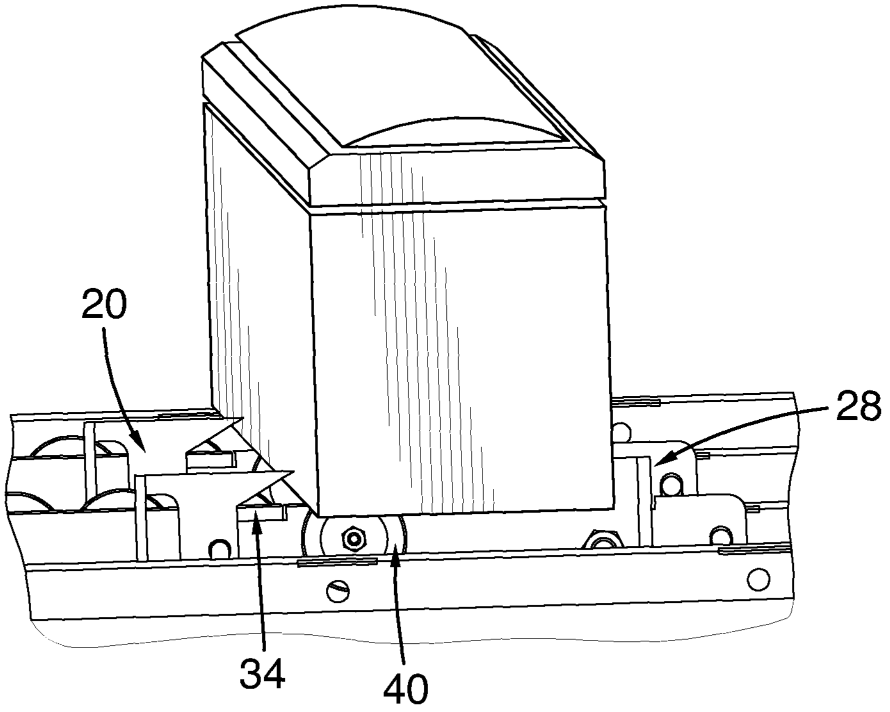
FIG. 13 is a front perspective view from the log dog side having the log rest in a second position.

The log rest (18) in accordance with an embodiment of the specification can be coupled to the frame (6) by fastening means, such as a bolt (21), that can permit rotation of the log rest (18). The log rest (18) as disclosed herein, has a log rest first face (22) and a log rest second face (24) and is pivotably rotatable about an axis from a log rest first position (as shown in FIGS. 6-11) to a log rest second position (as shown in FIGS. 12 and 13). In the log rest first position (26; FIGS. 6 to 10), the log placed on the assembly (4) can contact the log rest first face (22), while in the log rest second position (28; FIGS. 12 and 13), the log contacts the log rest second face (24). Alternatively, the log rest can be vertically slideable to achieve the same effect as the pivot.

In the embodiment disclosed in the figures, the log rest (18) is formed by a generally L-shaped member, which has two edges—a long edge and a short edge (depicting the log rest first face (22) and second face (24), respectively). To control movement of the log rest (18) between the log rest first position (26) to the log rest second position (28), a base plate (52) is attached to the frame (6), which can prevent complete rotation of the log rest (18). In a log rest first position (26), the short edge of the L-shaped member can contact the base plate (52), and in the log rest second position (28), the long edge of the L-shaped member can contact the base plate (52) to limit the rotation of the log rest (18). In a further embodiment, as shown, the log rest (18) can be provided with a stop plate (54) that can contact the base plate (52) in both the log rest first (26) and second (28) positions to further limit rotation of the log rest (18).

Figure 6:
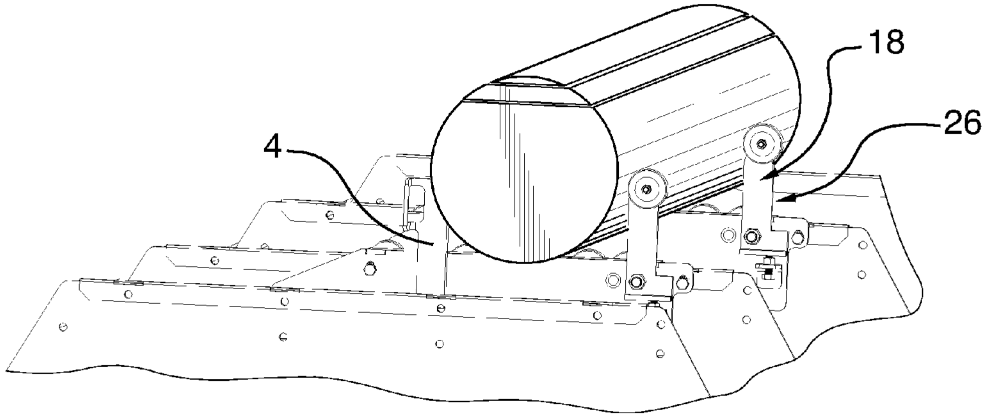
FIG. 6 is a front perspective view from the log rest side having the log rest in a first, raised position.
Figure 7:
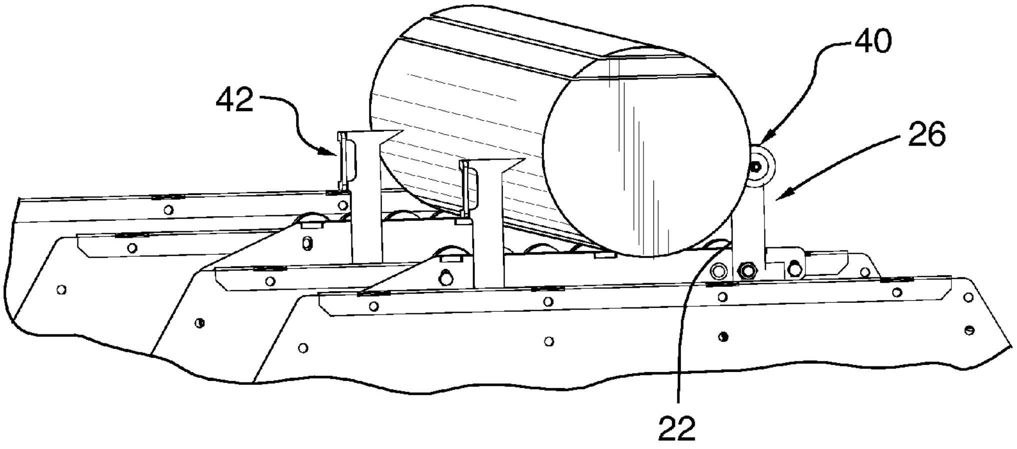
FIG. 7 is a front perspective view from the log dog side having the log rest in a first position.
Figure 8:
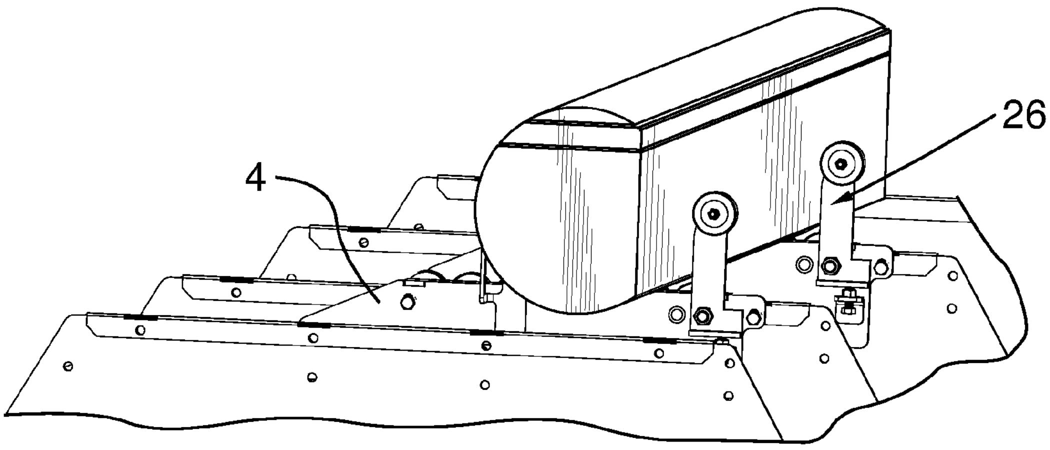
FIG. 8 is another front perspective view from the log rest side having the log rest in a first position after partially sawmilling the log.
Figure 9:
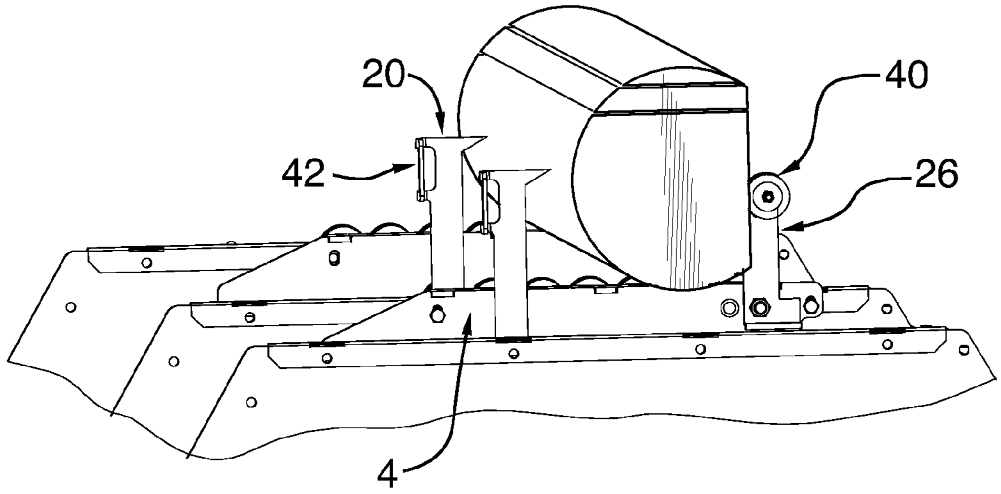
FIG. 9 is another front perspective view from the log dog side having the log rest in a first position after partially sawmilling the log.
Figure 10:
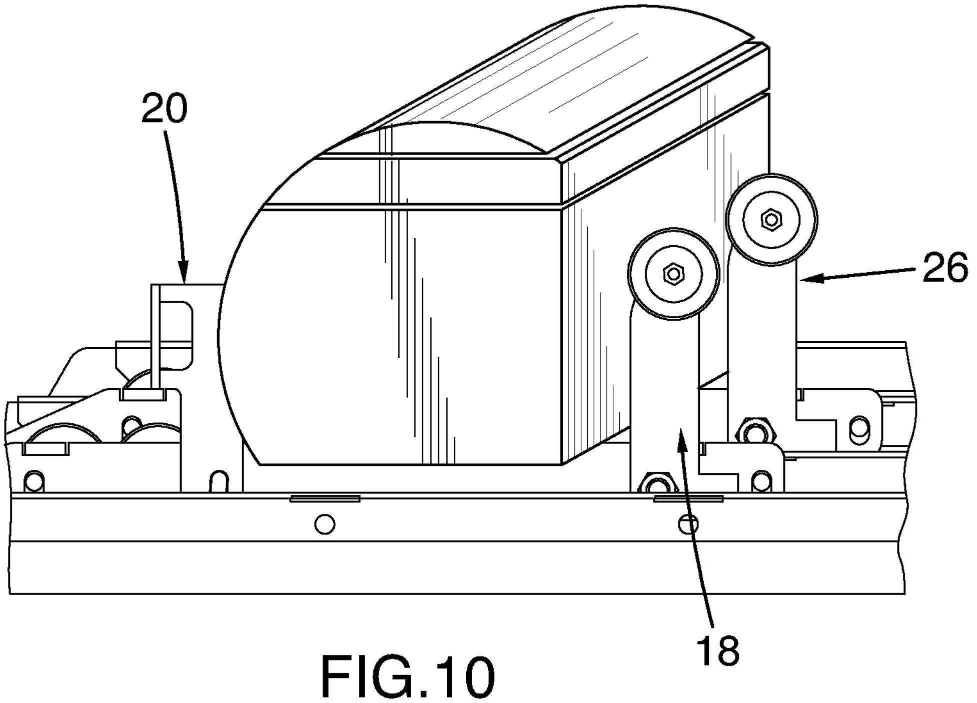
FIG. 10 is still another front perspective view from the log rest side having the log rest in a first position in use with a log cant.
Figure 11:
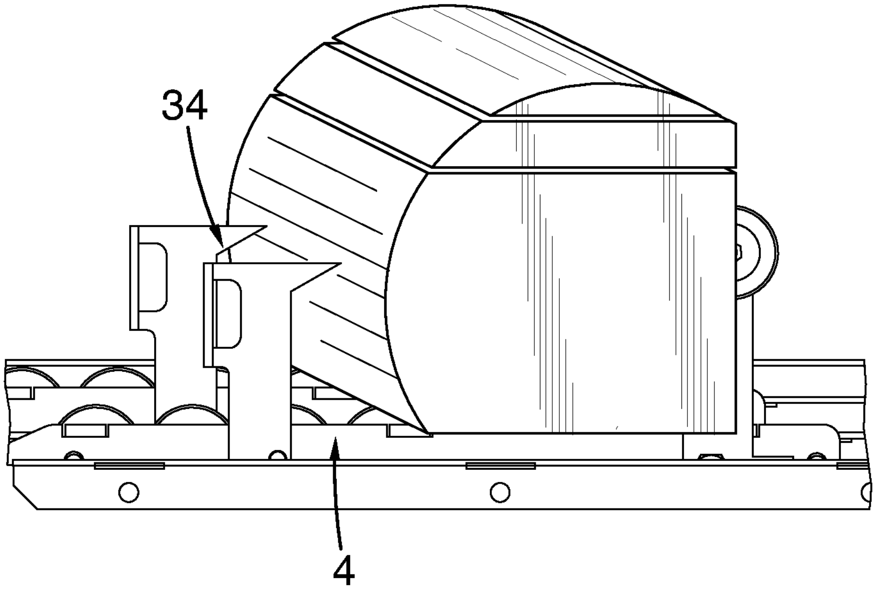
FIG. 11 is still another front perspective view from the log dog side having the log rest in a first position in use with a log cant.

Further, the log rest (18) can be provided with a wheel (40) at the end of the log rest (18), such as at an end of the log rest first face (22). During operation, as shown in FIGS. 6-7, a log that is generally cylindrical, can be placed on the assembly (4) and pushed against the log rest first face (22; see also FIG. 2) of the log rest (18). Use of the longer edge (22) in conjunction with base plate (52) prevents the log from falling off the assembly (4), while the wheel (40) at the end of the log rest (18) can function as a rolling-element bearing. More importantly, wheel (40) prevents hang ups when rolling the log, because it does not allow bark to dig in to the end of the log rest. The height of the long edge (or log rest first face (22)) is selected to permit sawing of the log, without causing hindrance, while providing a rest surface for the log.

As the sawing of the log continues, forming squared cants/lumbers, the height of the log can decrease. The lumber can be rolled or shifted on to the assembly (4), followed by rotating the log rest (18) to the log rest second position (28) to permit the lumber to contact the log rest second face (24), which as shown in FIGS. 12 and 13, is formed by the short edge. As the lumber has a squared surface that contacts the short edge of the log rest (18), it is prevented from rolling of the assembly (4), while permitting the log to be further milled. The shorter edge (24) of the L-shaped log rest (18) allows for cutting close to the log deck.

For clamping the log, the assembly (4) is also provided with a log dog (20) that has a post (32) and a pick (34) for biting into the wood. The log dog (20) as disclosed in the figures is slideably moveable from the second end (10) towards the first end (8) of the frame (6). As shown in the figures, the log dog (20) can also be provided with a handle (42) for assisting in sliding the log dog (20) on a beam (44) towards and away from the first end (8) of the frame (6). In the embodiment shown in FIGS. 1-3, the beam (44) is spaced from and affixed to the frame (6) by fastening means, such as a nut and bolt, to permit a housing (46) containing the post (32) of the log dog (20) to slide along the beam (44).

In one embodiment as disclosed herein, the housing (46) containing the post (32) of the log dog (20) is fixably releasable and permits slideable movement of the log dog (20) in a direction generally perpendicular to the longitudinal length of the frame (6) or beam (44). As shown in FIG. 3, the housing (46) is formed by a first plate (48) and a second plate (50), with the first plate (48) and the second plate (50) sandwiching the post (32) of the log dog (20) and the beam (44). Vertical plates (60, 61) and horizontal plates (62, 63) are sandwiched in between first plate (48) and second plate (50) of the housing. The vertical plates (60, 61) in turn hold the log dog (20) in position with a rather tight tolerance, and horizontal plates (62, 63) hold the log dog (20) to the beam (44) with a rather tight tolerance. This the assembly of housing parts (50, 62, 63, 60, 61, and 48) creates a squared housing, both vertically and horizontally, that creates a frame for binding the log dog for preventing movement of the log dog in a direction generally perpendicular to the longitudinal length of the frame when the log dog is subjected to pressure from a log, assisting the one handed operation of the entire assembly.

The housing (46) can also be provided with fastening means, such as a bolt (56), for affixing the log dog (20) for preventing movement of the log dog (20) in a direction generally perpendicular to the longitudinal length of the frame (6) or beam (44). In the embodiment disclosed herein, the fastening means fasten the post (32) between the first plate (48) and the beam (44). The fastener (56) can be loosened to adjust log dog (20) vertically.

During operation, the fastening means can be loosened to adjust the distance between the pick (34) and the beam (44), thereby adjusting the height of the log dog (20). Once the desired height of the log dog (20) has been established, the log dog (20) is moved towards the log rest (18) for clamping the log. Additional fastening means can be provided for fastening and preventing movement of the log dog (20) between the first end (8) and second end (10) of the frame (6). In this manner, the assembly (4) can be used to assist in handling and clamping a log on the assembly (4), as follows. The log dog (20) is slide into the log, and the torque applied to the log dog binds the housing (46) against the rail, thus holding the log dog against the log.

Importantly, by avoiding the use of fasteners to hold the log, the system can be operated by one hand. Inc contrast, the use of fasteners results in a two handed task. By pushing against engage handle (64), a tight fit is achieved, holding log dog (20) in place. Pulling on release handle (66) will then allow the log dog to be readily repositioned.

Although not particularly limited, as shown in the figures, the log rest (18) and the log dog (20) are positioned on the front face (12) of the frame (6), while the rollers (16) are positioned on a back face (14) of the frame (6). The position of front and back face is arbitrary, and as described herein, the front face (12) relates to the face first encountered by the log while being moved towards the saw, while the back face is more proximate to the saw.

The assembly (4) disclosed herein is attached to a sawmill, which relates to another aspect of the specification. In a further aspect, the parts of the assembly (4), as disclosed herein, can be provided separately as a kit, for retrofitting a log rolling, support and clamp assembly (4) to a portable sawmill. The assembly's design enables it to be manufactured from extremely sturdy, reasonably inexpensive materials, and permits a high level of configurability for different size logs and differing stages in the milling process.

The assembly provides a simple, versatile, cost-effective and portable log rolling, support system for a sawmill, such as a portable sawmill. The system provide easy movement and fixing of the log onto it, and can allow for a user to clamp the log in place on the log rolling, support/clamp assembly utilizing only one hand. The log rests directly on the rollers. The rollers, in turn, substantially reduce friction such that the operator can, often, without any additional tools such as a cant hook, roll the log around and around by hand. The rollers are not so high above the top of the bunks that they interfere with the cutting or substantially affect capacity.

The second element of the assembly is the log clamping functionality. The assembly permits the user to use one hand to stabilize the log until the log rest (18) is in the desired position, and the log clamped between the log rest (18) and the log dog (20). The log rest (18) is thus the back-stop against which the log rests and against which the log dog (20) exerts force, thereby clamping the log. The log rests swing up and down, which permits one-handed operation. They have two edges—a long and short, for logs in the round, and squared cants/lumbers, respectively. The log dogs feature picks to bite into the wood, and slide along a frame towards or away from the log/cant. They stay locked against the wood by binding on their frames.

The log rest (18) can thus allow the user to quickly change the position of the log rest (18), and thus its height, to suit the log being milled. The log rest (18) can also be turned with one hand, and, after being turned, the log rest (18) automatically stops in position.

The assembly (4) can be particularly suitable for portable sawmills, and for use by hunters, "do-it-yourselfers", and people situated in remote areas, who need to saw boards, clapboards, shingles, etc., since it allows for a highly variable log size to be affixed to it, and can allow for a single operator to maneuver the log into place, then clamp the log in place using only one hand to operate the clamp mechanism. This allows the user to use their other hand to stabilize the log, greatly improving use and safety of a sawmill, for example, when a single person, in a remote area, is sawing logs. The assembly can also allow great flexibility in the size of logs being clamped to it, thanks to its adjustable nature. Notably, the log rest can be adjusted depending on the size and shape of the log in an easy, one-handed manner.

Certain adaptations and modifications of the described embodiments can be made. Therefore, the above discussed embodiments are considered to be illustrative and not restrictive.

TABLE OF ELEMENTS

2 portable sawmill
4 log rolling, support and clamp assembly
6 longitudinal frame
8 first end of frame
10 second end of frame
12 front face of frame
14 back face of frame
16 rollers
18 log rest
20 log dog
22 log rest first face
24 log rest second face
26 log rest first position
28 log rest second position
30 wheel
32 post of log dog
34 pick of log dog
36 cross-bunk
38 log deck (bed) of sawmill
40 wheel for log rest
42 handle for log dog
44 beam
46 housing
48 first plate of housing
50 second plate of housing
52 base plate
54 stop plate
56 bolt
58 handle bolt
59 bolt holes
60, 61 vertical plates
62, 63 horizontal plates
64 engage handle
66 release handle

What is claimed is:

1. A log rolling, support and clamp assembly, comprising:
a longitudinal frame having a first end and a second end;
a plurality of rollers positioned along the length of the frame from the first end to the second end and permitting rolling of a log on the assembly; and
a log rest coupled proximately to the first end of the frame; and
a log dog coupled proximately to the second end of the frame and slideably moveable between the second end and the first end;
wherein the log rest comprises a generally L-shaped log rest having a log rest first face and a log rest second face transverse to the log rest first face, with an entirety of the log rest being pivotably rotatable about an axis between a log rest first position and a log rest second position,
wherein the log rest contacts the log with the log rest first face in the log rest first position and the log rest second face in the log rest second position.

2. The log rolling, support and clamp assembly according to claim 1, wherein the log dog is fixably releasable for slidable movement of the log dog in a direction generally perpendicular to a longitudinal length of the frame.

3. The log rolling, support and clamp assembly according to claim 1, further comprising a squared housing for binding the log dog for preventing movement of the log dog in a direction generally perpendicular to a longitudinal length of the frame when the log dog is subjected to pressure from a log.

4. The log rolling, support and clamp assembly according to claim 1, further comprising a wheel at an end of the log rest.

5. The log rolling, support and clamp assembly according to claim 1, wherein the rollers comprise a plurality of wheels positioned on a back face of the frame.

6. The log rolling, support and clamp assembly according to claim 1, wherein the log rest and the log dog are positioned on a front face of the frame.

7. The log rolling, support and clamp assembly according to claim 1, wherein the slidable movement is vertical and horizontal.

8. The log rolling, support and clamp assembly according to claim 1, wherein the log dog comprises a post and a pick at an end of the post.

9. The log rolling, support and clamp assembly according to claim 1, wherein the log dog further comprises a handle.

10. A portable sawmill bed comprising one or more of the log rolling, support and clamp assemblies as defined in claim 1.

11. A kit for retrofitting a manual log rolling, support and clamp assembly to a portable sawmill, said kit comprising:
a longitudinal frame having a first end and a second end;
a plurality of freely rotating rollers couplable to and positionable along the length of the frame from the first end to the second end and permitting rolling of a log on the assembly;
a log rest couplable proximately to the first end of the frame;

a log dog couplable proximately to the second end of the frame and slideably moveable between the second end and the first end; and means for affixing the longitudinal frame to the portable sawmill;

wherein the log rest is a generally L-shaped member comprising a log rest first face and a log rest second face transverse to the log rest first face, with an entirety of the log rest being pivotably rotatable about an axis from a log rest first position to a log rest second position, wherein the log rest permits contact of the log with the log rest first face in the log rest first position and with the log rest second face in the log rest second position.

12. The kit according to claim 11, further comprising a wheel at an end of the log rest.

13. The kit according to claim 11, wherein the rollers comprise a plurality of wheels positionable on a back face of the frame.

14. The kit according to claim 11, wherein the log dog is fixably releasable for slidable movement of the log dog in a direction generally perpendicular to a longitudinal length of the frame.

15. The kit according to claim 11, further comprising a squared housing for binding the log dog for preventing movement of the log dog in a direction generally perpendicular to a longitudinal length of the frame when the log dog is subjected to pressure from a log.

16. The kit according to claim 14, further comprising a fastener for affixing the log dog for preventing movement of the log dog in a direction generally perpendicular to the longitudinal length of the frame.

17. The kit according to claim 14, wherein the slidable movement is vertical and horizontal.

18. The kit according to claim 11, wherein the log dog comprises a post and a pick at an end of the post.

* * * * *